(12) United States Patent
Sasnowski et al.

(10) Patent No.: US 7,568,714 B2
(45) Date of Patent: Aug. 4, 2009

(54) BICYCLE HAVING A REMOVABLE POWER ASSIST MODULE

(75) Inventors: Allan Sasnowski, Stouffville (CA); Fabio Venier, Holland Landing (CA)

(73) Assignee: Magna Marque International Inc., Aurora, Ontario (CA)

( * ) Notice: Subject to any disclaimer, the term of this patent is extended or adjusted under 35 U.S.C. 154(b) by 302 days.

(21) Appl. No.: 11/596,631

(22) PCT Filed: May 17, 2005

(86) PCT No.: PCT/IB2005/004150

§ 371 (c)(1), (2), (4) Date: Nov. 15, 2006

(87) PCT Pub. No.: WO2006/090213

PCT Pub. Date: Aug. 31, 2006

(65) Prior Publication Data

US 2007/0222170 A1    Sep. 27, 2007

(51) Int. Cl.
*B62K 11/04*    (2006.01)
(52) U.S. Cl. ............... 280/205; 180/205; 180/206; 180/207; 180/220; 180/223; 280/207; 280/220
(58) Field of Classification Search ......... 180/205–207, 180/220, 223; 280/205, 207, 220
See application file for complete search history.

(56) References Cited

U.S. PATENT DOCUMENTS

| | | | |
|---|---|---|---|
| 3,431,994 A | 3/1969 | Wood, Jr. | |
| 3,921,745 A | 11/1975 | McCulloch et al. | |
| 3,991,843 A | 11/1976 | Davidson | |
| 4,044,851 A | 8/1977 | Shaw et al. | |
| 4,168,758 A * | 9/1979 | Holt | 180/206 |
| 5,076,386 A | 12/1991 | Ferneding | |
| 5,242,028 A * | 9/1993 | Murphy et al. | 180/220 |
| 5,560,266 A * | 10/1996 | Shikimori et al. | 74/594.1 |
| 5,602,448 A * | 2/1997 | Yaguchi | 318/139 |
| 5,758,735 A * | 6/1998 | MacCready et al. | 180/206 |
| 5,941,332 A * | 8/1999 | Dimick | 180/205 |
| 6,336,516 B1 * | 1/2002 | McNelly | 180/206 |
| 6,976,551 B2 * | 12/2005 | Spanski | 180/207 |
| 7,207,584 B2 * | 4/2007 | Forderhase | 280/205 |

FOREIGN PATENT DOCUMENTS

| | | |
|---|---|---|
| EP | 0 590 674 A1 | 4/1994 |
| GB | 2 249 529 A | 5/1992 |

OTHER PUBLICATIONS

English Abstract of DE 69316127 (T2) published on Apr. 16, 1998, which was also published as EP0590671 A1 cited above.

* cited by examiner

*Primary Examiner*—Lesley D Morris
*Assistant Examiner*—Michael R Stabley
(74) *Attorney, Agent, or Firm*—Clark Hill PLC

(57) ABSTRACT

A power assist module includes a battery powered motor mounted on a manually operated vehicle, such as a bicycle. The power assist module is fixedly mounted on the bicycle and can be easily removed without the need for tools, so that the bicycle can be manually operated in a conventional manner when so desired without carrying the extra weight of the power assist module. The power assist module includes a motor assembly which is operated through a gear reduction assembly to drive a crank drive gear mounted in conjunction with a crank arm of the bicycle.

12 Claims, 3 Drawing Sheets

BICYCLE HAVING A REMOVABLE POWER ASSIST MODULE

BACKGROUND OF THE INVENTION

1. Field of the Invention

The present invention relates to an electrically operated power assist apparatus for a manually operated vehicle, such as a bicycle, and, more particularly, to a new and novel construction of a power assist apparatus for a bicycle.

2. Description of the Related Art

By way of background, FIG. 1 illustrates a standard bicycle which includes a front steering wheel 50 and a rear wheel 60, which may be attached to a frame 20. The frame has a head tube 32 which journals a front fork 52 for steering via handles bars 33 by a rider of the bicycle 100. A seat tube 21 is carried by the frame 20 adjacent the rear wheel 60 and a seat post, upon which a saddle type seat 25 is positioned thereon to accommodate a rider, is slidably received in the seat tube 21 for adjusting the height of the seat 25.

In the standard bicycle 100, a horizontally oriented crank journal 113 is positioned beneath the seat tube 21 for supporting a rider-propelled drive mechanism 120. The drive mechanism 120 generally comprises a crank arm 123 having a first end journalled to each side of the crank journal 113 and an opposite second end rotatably supporting a pedal 25. A chain sprocket 129 having a plurality of circumferential teeth is fixedly secured to the crank journal 113. A chain 140 is wrapped around the chain sprocket 129 and a rear sprocket 150 mounted to the rear wheel 60, whereby application of power by the rider on the pedals 25 rotates the sprockets 129, 150, and hence the rear wheel 60, to propel the bicycle 100. A derailleur (not shown) is often substituted from the single rear sprocket 150, and may have a plurality of sprockets to provide variable gearing for rider comfort and efficiency when encountering variable terrain.

Bicycles have been utilized as a means of transportation for over one hundred years. From an environmental standpoint, bicycles are preferable to automobiles and motorcycles because they are non-polluting. However, some people are deterred from using a bicycle due to the effort required to pedal up one or more inclines, or hills. Therefore, if a power assist device was incorporated into a bicycle with a minimum degree of difficulty and expense, then people would be more inclined to use a bicycle as a means of travel, especially for short trips, since the overall physical effort to propel the bicycle would be minimal.

Electric powered bicycles are known in the art, for example, as illustrated in U.S. Pat. Nos. 3,431,994 and 3,921,745. These types of electric powered bicycles incorporate an electric motor which is powered by one or more batteries. Typically, the motor operates through a drive wheel which frictionally engages with one of the wheels of the bicycle. Other methods include different configurations of direct drive systems, involving shafts, chains, and gears, but with the common feature of the driving motor being mounted on the bicycle frame in one position or another (e.g. near the pedaling sprocket, on one of the stays or on a rack above the rear wheel).

However, the prior art direct drive power assist devices for a bicycle have generally required complex gearing arrangements. Upon removal of the wheel for maintenance, such as tire repair, precise reengagement of the direct drive device is difficult, leading to excessive wear and noise during operation. Also, complex gearing arrangements are difficult to maintain in precise alignment when the bicycle encounters road bumps and holes. Further, the prior art direct drive power assist devices for bicycles have not been designed to be readily removable from the bicycle to permit normal manual usage without the extra weight of the direct drive device.

Accordingly, there is a need in the art for a modular power assist device for a bicycle that can be easily added to or removed from the bicycle, and which efficiently transmits torque to the crank journal without excessive noise or gear tooth wear due to misalignment.

SUMMARY OF THE INVENTION

According to one aspect of the invention, there is provided a power assist module removably attachable to a bicycle for providing power to the bicycle. The bicycle has a frame supporting at least one driven wheel and a drive gear coupled to the driven wheel. The power assist module comprises: a housing; an electric motor supported by the housing; and an output drive gear supported by the housing and operatively coupled to the electric motor for selectively engaging and driving the drive gear of the bicycle. At least one frame mounting block extends from the housing and is adapted to engage the frame of the bicycle and automatically align the output drive gear for meshed engagement with the drive gear of the bicycle. An attaching hook extends from the housing and is engagable with the frame of the bicycle for selectively and removably attaching the power assist module to the bicycle.

In another aspect, the present invention is a modular power assist device which can be readily added or removed from the bicycle without the need for tools, so that the bicycle can be manually operated in a normal manner when so desired without carrying the extra weight of the power assist apparatus.

A further objective of the present invention is to construct a power assist apparatus for a bicycle that efficiently transmits torque to the crank journal without excessive noise or gear tooth wear due to misalignment.

Another objective of the present invention is to construct a power assist apparatus which is composed of few parts, is of lightweight construction, is efficient, is durable and requires a minimum of maintenance.

Another objective of the present invention is to construct a smoothly operating, vibration free, direct drive, power assist apparatus for a bicycle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
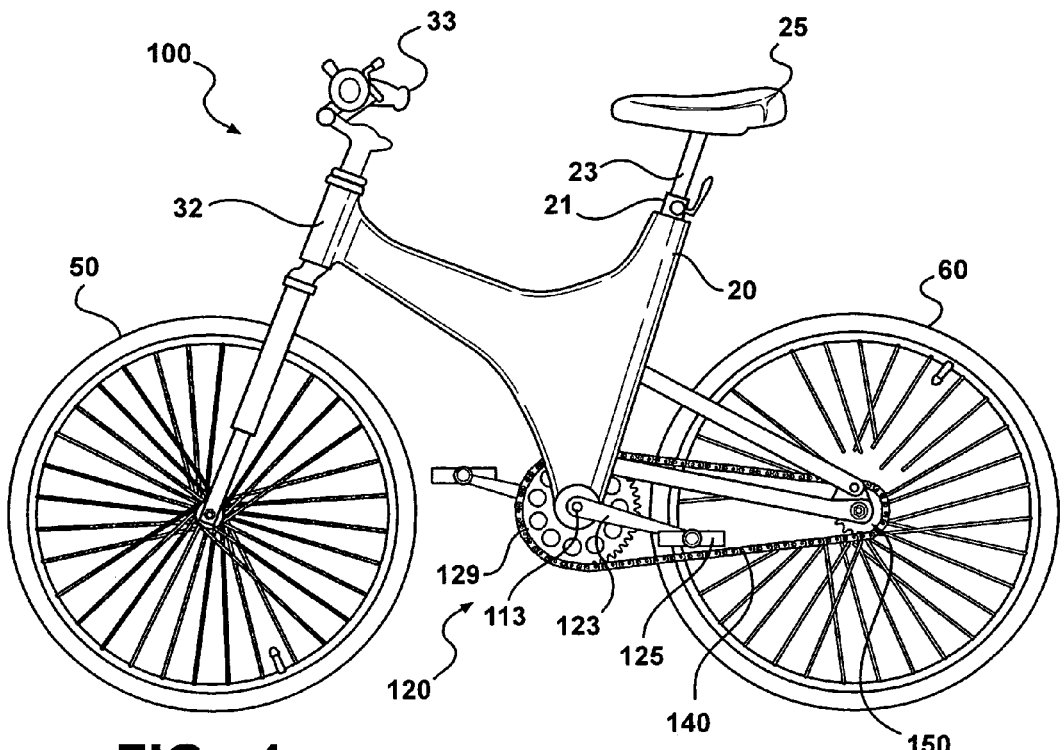
FIG. 1 is a side view of a prior art standard bicycle, which shares the same basic parts or components as the improved bicycle disclosed herein.
Figure 2:
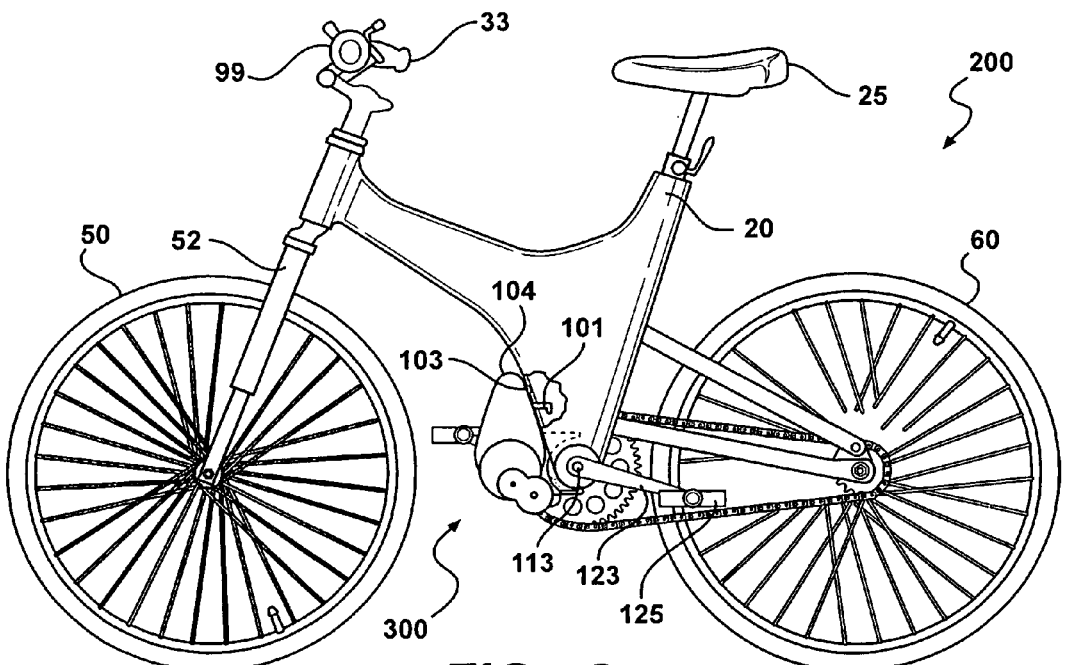
FIG. 2 is a side view of a bicycle incorporating the preferred embodiment of the invention.

Referring to FIGS. 2-6, wherein like numerals indicate like or corresponding parts throughout the several views, the preferred embodiment of the invention includes a bicycle generally shown at 200 having a front steering wheel 50 and a rear wheel 60 attached to a frame 20.

The bicycle 200 has a crank arm 123 with a first end journalled to each side of a crank journal 113 and an opposite second end rotatably supporting a pedal 125. The crank journal 113 includes a front chain sprocket 129 having a plurality of circumferential teeth and a toothed rear sprocket 150 mounted to the rear wheel 60. A chain 140 is wrapped around each of the chain sprocket 129 and the rear sprocket 150 and in driving engagement with the teeth thereon whereby application of power by the rider on the pedals 125 rotates the crank journal 113 and propels the bicycle 200 as is commonly known in the art.

The subject invention relates to a self-contained electric or power assist module 300. The power assist module 300 is illustrated in detail in FIG. 3, and generally comprises a rechargeable bank of batteries 109 mounted within a stylized housing 104, an electric motor 105, a gear reduction assembly 106, an output drive gear 112, frame mounting blocks 107 and, an attaching hook 101 and clamp 102. For reference, a phantom outline of a crank drive gear 108 is also shown in FIG. 3.

An alternative location for the batteries 109 can be within the hollow interior of the frame 20, either in the crossbar members, one of the down tubes, or in the interior of a moncoque type frame.

Figure 3:
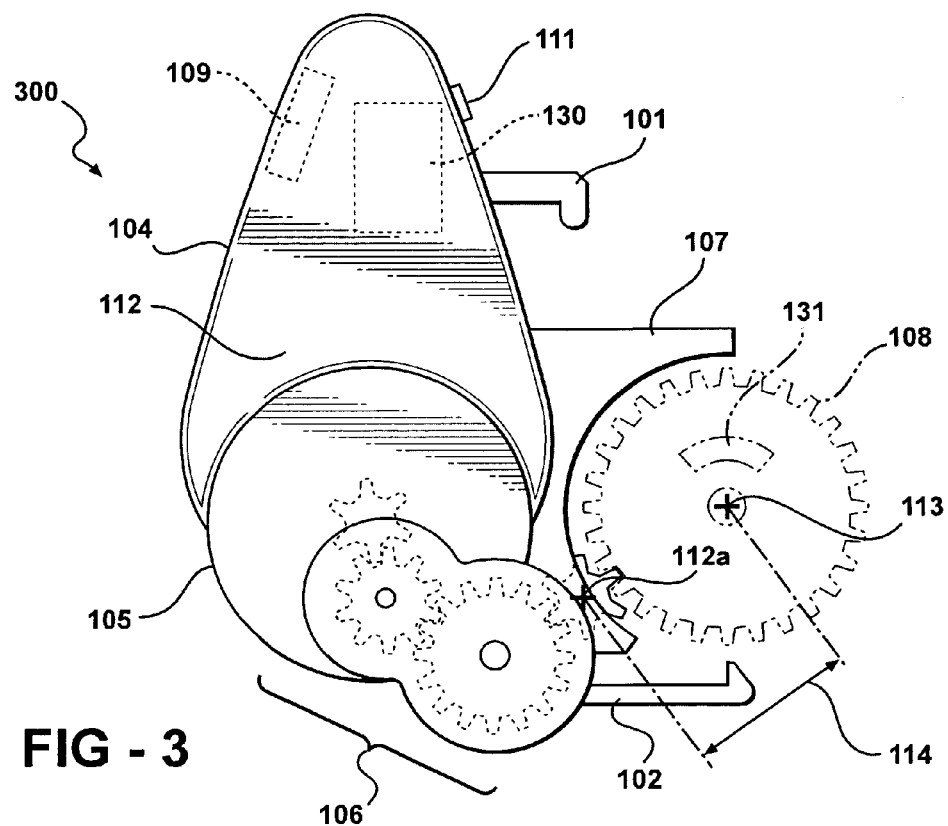
FIG. 3 is a side view of the power assist module and its interaction with the crank drive gear according to one aspect of the invention.
Figure 4:
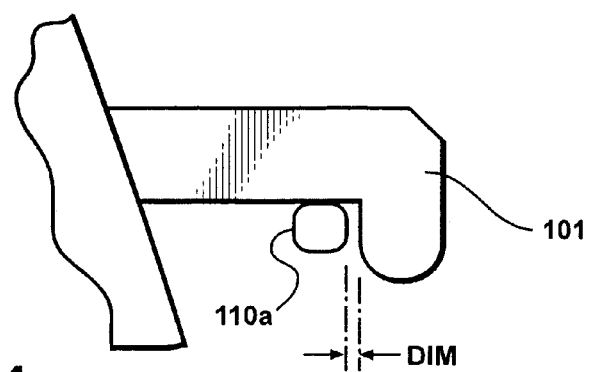
FIG. 4 is a side view of the upper hook arrangement of the power assist module.
Figure 5:
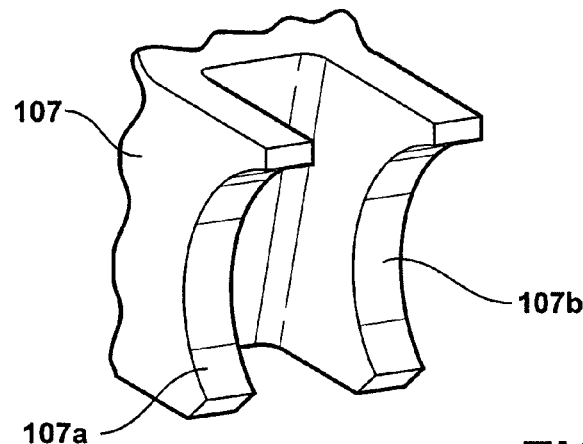
FIG. 5 is a perspective view of the mounting block that interfaces with the bottom bracket of the bicycle frame.
Figure 6:
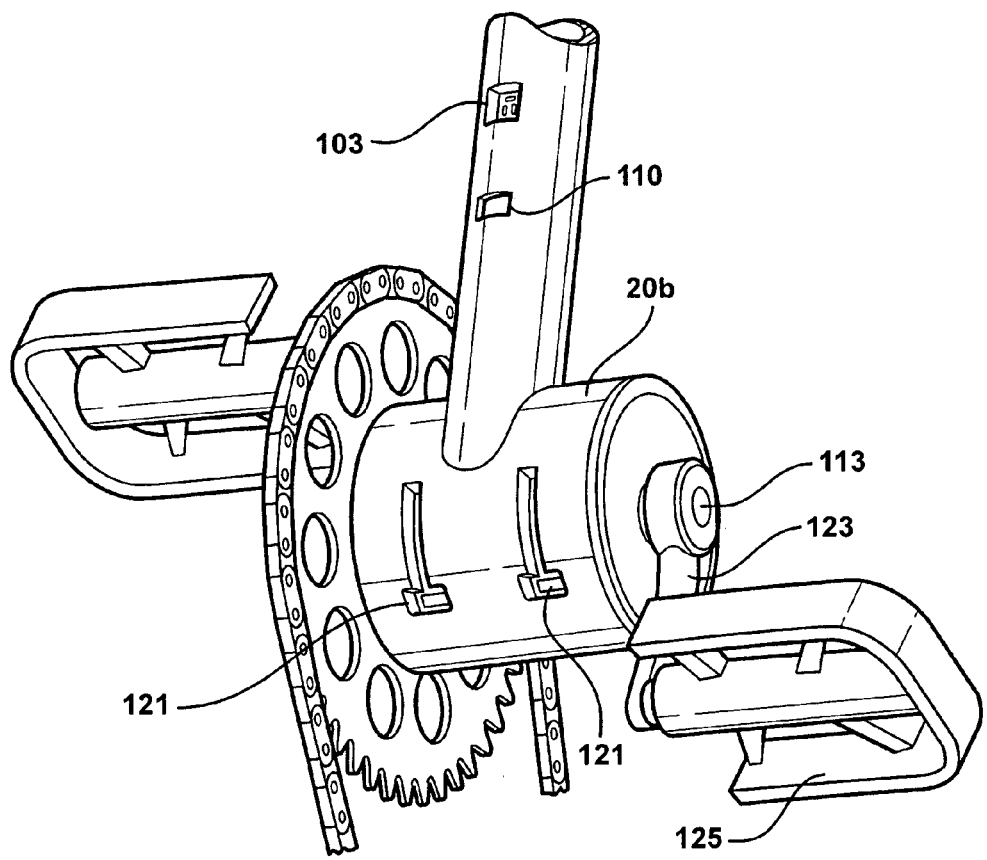
FIG. 6 is a fragmentary, perspective view of the bottom bracket and bicycle frame including the mounting positions for the hook and catch.

Referring to FIGS. 3, 5, and 6, in the preferred embodiment, the power assist module 300 interfaces with the frame 20 of the bicycle by way of the frame mounting blocks 107 engaging a machined bottom portion 20B of the frame 20. The machined surfaces of the bottom portion 20B of the frame 20, commonly referred to as the bottom bracket, are cylindrical and concentric to the center of the crank journal 113.

Referring specifically to FIGS. 5 and 6, the mounting blocks 107 include spaced apart and parallel mounting blocks 107a and 107b defining arcuate mating surfaces for mating flush against the frame mounting bottom portion 20B and become concentric with the center of the crank journal 113. The purpose of this arrangement is to ensure that the output gear 112 from the power assist module 300 and the crank drive gear 108 are correctly engaged, that is, the accuracy of their center-to-center distance 114 (shown in FIG. 3), is maintained irrespective of the final positioning of the hooks 101 and clamps 102 that hold the module in place on the bicycle frame 20.

The installation and removal of the self-contained power assist module 300 is readily accomplished and without the aid of tools. The module 300 is installed onto the bicycle frame 20 by simultaneously engaging the upper hook 101 and the mounting blocks 107 onto their corresponding mating positions on the bicycle frame 20, namely mating cavity 110 and cylindrical bottom frame 20B. The mating cavity 110 includes a frame catch 110a for engaging with the hook 101 to releasably retain the hook in the cavity 110. The mounting blocks 107 are the prime locators of the power assist module 300 onto the bottom frame 20B and control the placement of the output drive gear 112 with respect to the frame 20, and hence, the crank drive gear 1-8. Once the module 300 is positioned relative to the bottom frame 20B, the locking hooks 102, located on the underside of the module 300, are engaged with mating catches 121 on the frame 20, and tightened in order to lock the module 300 securely to the frame 20. An electrical connector 103 is located in the bicycle frame 20 and engages with a mating electrical connector 111 on the power assist module 300 when the module 300 interfaces with the frame 20. No further assembly or rider intervention is required. Because the power assist module 300 can rotate, via the interface between the bottom frame 20B and the mounting blocks 107, an latitude between the upper hook 101 and the frame catch 110a is eliminated once the lower hook 102 is tightened into place within the mating catches 121.

Thus, being correctly engaged, the module output gear 112 can efficiently transmit torque to the crank drive gear 108 without excessive noise and gear tooth wear due to poor alignment. Because the cylindrical mounting surfaces of the bottom frame 20B, pedal spindle axis of the crank journal 113, and crank drive gear 108 are all concentric to each other, the accurate placement of the output drive gear 112 with respect to the driven crank drive gear 108 is ensured.

In the preferred embodiment, the operation of the self-contained power assist module 300 is controlled by, for example, a handlebar mounted switch 99 that enables the rider to selectively turn the power assist module 300 on or off as desired. An electronic controller module 130, located within the battery housing 104, is utilized in order to regulate the amount of assist provided by the power assist module 300 depending upon the level of effort being expended by the rider. For example, the harder the rider pedals, the more assist is provided. When the rider begins moving the pedals and applying torque to the crank journal 113, an electronic sensor 131 adjacent to or encircling the crank journal 113 sends electrical signals, in proportion to the load applied, to the controller 130 which processes the signals and determines the appropriate amount of current from the storage batteries 109 to be directed to the electric motor 105.

In the preferred embodiment, to effect the removal of the self-contained power assist module 300 from the bicycle frame 20, the locking hooks 102 are disengaged from the mating catches 121, the upper hook 101 is released from the frame catch 110a, and the module 300 is removed. At this point, the electrical connection between the connector 103 and mating connector 111 also becomes disengaged.

While the form of apparatus described herein constitutes a preferred embodiment of the invention, it is to be understood that the invention is not limited to this precise form of apparatus. For example, it is within the scope of the invention that the power assist module could also be used in conjunction with other manually operated vehicles such as tricycles, scooters, and the like.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A power assist module removably attachable to a bicycle for providing power to the bicycle, the bicycle having a frame supporting at least one driven wheel and a drive gear coupled to the driven wheel, said power assist module comprising:
   a housing;
   an electric motor support by said housing;
   an output drive gear supported by said housing and operatively coupled to said electric motor for selectively engaging and driving the drive gear of the bicycle;

at least one frame mounting block extending from said housing and adapted to engage the frame of the bicycle and automatically align said output drive gear for meshed engagement with the drive gear of the bicycle;

an attaching hook extending from said housing and engagable with the frame of the bicycle for selectively and removably attaching said power assist module to the bicycle; and an attaching clamp extending from said housing and spaced below said attaching hook wherein said frame mounting block is positioned between said attaching hook and said attaching clamp, said attaching clamp further engagable with the frame of the bicycle for selectively and removably attaching said power assist module to the bicycle with said output drive gear aligned and engaged with the drive gear of the bicycle.

2. A power assist module as set forth in claim 1 further including a gear reduction assembly supported by said housing and operatively coupled between said electric motor and said output drive gear for transferring power from said electric motor to rotation of said output drive gear.

3. A power assist module as set forth in claim 2 further including a power supply stored within said housing and coupled to said electric motor for providing power to said motor.

4. A power assist module as set forth in claim 3 further including an electric control module within said housing and operatively coupled to said electric motor for automatically controlling actuating of said electric motor.

5. In combination, a bicycle and power assist module removably attachable to said bicycle for selectively providing power to propel said bicycle, said bicycle comprising a frame for supporting at least one driven wheel, a bottom frame bracket for rotatably supporting a crank drive gear and a chain operatively coupled between said crank drive gear and said driven wheel for transferring torque therebetween; said power assist module comprising a housing; an electric motor supported by said housing; an output drive gear supported by said housing and operatively coupled to said electric motor for selectively engaging and driving said drive gear of said bicycle; at least one frame mounting block extending from said housing for engaging said bottom frame bracket of said bicycle and automatically align said output drive gear for meshed engagement with drive gear of said bicycle; an attaching hook extending from said housing and engagable with said frame of the bicycle for selectively and removably attaching said power assist module to the bicycle; and an attaching clamp extending from said housing and spaced below said attaching hook wherein said frame mounting block is positioned between said attaching hook and said attaching clamp, said attaching clamp further engagable with said frame of said bicycle for selectively and removably attaching said power assist module to said bicycle with said output drive gear aligned and engaged with said drive gear of said bicycle.

6. A combination bicycle and power assist module as set forth in claim 5 further including a gear reduction assembly supported by said housing and operatively coupled between said electric motor and said output drive gear for transferring power from said electric motor to rotation of said output drive gear.

7. A combination bicycle and power assist module as set forth in claim 6 further including a power supply stored within said housing and coupled to said electric motor for providing power to said motor.

8. A combination bicycle and power assist module as set forth in claim 7 further including an electronic control module within said housing and operatively coupled to said electric motor for automatically controlling actuating of said electric motor.

9. A combination bicycle and power assist module as set forth in claim 8 further including a plurality of mating cavities formed in said bottom frame bracket of said bicycle for receiving and engaging said attaching hook and attaching clamp, respectively, removably attaching said power assist module to said bicycle.

10. A combination bicycle and power assist module as set forth in claim 9 further including a crank arm coupled to said crank drive gear for manually rotating said crank drive gear and transferring torque to said driven wheel to propel said bicycle.

11. A combination bicycle and power assist module as set forth in claim 10 further including an electronic sensor mounted adjacent said crank drive gear for sensing torque load on said crank drive gear.

12. A combination bicycle and power assist module as set forth in claim 11 further including an electrical connector mounted to said frame of said bicycle and a mating connector mounted to said housing of said power assist module for sending electric signals of said torque load from said electronic sensor to said electronic control module whereby said control module processes the signals and applies a select amount of current from said batteries to said electric motor to power assist and drive the crank drive gear of said bicycle.

* * * * *